US009799915B2

(12) United States Patent
Larfaillou et al.

(10) Patent No.: US 9,799,915 B2
(45) Date of Patent: Oct. 24, 2017

(54) PUTTING INTO SERVICE OF A LITHIUM ION BATTERY

(71) Applicant: STMICROELECTRONICS (TOURS) SAS, Tours (FR)

(72) Inventors: Severin Larfaillou, Tours (FR); Delphine Guy-Bouyssou, Luynes (FR)

(73) Assignee: STMICROELECTRONICS (TOURS) SAS, Tours (FR)

( * ) Notice: Subject to any disclaimer, the term of this patent is extended or adjusted under 35 U.S.C. 154(b) by 93 days.

(21) Appl. No.: 14/673,547

(22) Filed: Mar. 30, 2015

(65) Prior Publication Data
US 2015/0325878 A1 Nov. 12, 2015

(30) Foreign Application Priority Data

May 9, 2014 (FR) .................................. 14 54173

(51) Int. Cl.
| | |
|---|---|
| *H01M 10/052* | (2010.01) |
| *H01M 10/44* | (2006.01) |
| *H01M 10/0585* | (2010.01) |
| *H01M 4/38* | (2006.01) |
| *H01M 4/40* | (2006.01) |
| *H01J 7/00* | (2006.01) |
| *H01M 4/04* | (2006.01) |
| *H01M 4/134* | (2010.01) |
| *H01M 4/1395* | (2010.01) |

(Continued)

(52) U.S. Cl.
CPC ....... *H01M 10/052* (2013.01); *H01M 4/0445* (2013.01); *H01M 4/134* (2013.01); *H01M 4/1395* (2013.01); *H01M 4/38* (2013.01); *H01M 4/405* (2013.01); *H01M 10/0562* (2013.01); *H01M 10/0585* (2013.01); *H01M 10/44* (2013.01); *H02J 7/007* (2013.01); *H01M 4/382* (2013.01)

(58) Field of Classification Search
CPC .......... H01M 10/052; H01M 10/0562; H01M 10/0585; H01M 10/44; H01M 4/38; H01M 4/405; H01M 4/1395; H01M 4/0445; H01M 4/134; H02J 7/007
See application file for complete search history.

(56) References Cited

U.S. PATENT DOCUMENTS

| | | | |
|---|---|---|---|
| 6,203,947 B1 * | 3/2001 | Peled ................. | H01M 4/0445 429/221 |
| 2006/0068291 A1 | 3/2006 | Herzel et al. | |

(Continued)

FOREIGN PATENT DOCUMENTS

| | | | | |
|---|---|---|---|---|
| EP | 0689260 A1 | | 6/1995 | |
| JP | 2003-100351 | * | 4/2003 | ............ H01M 10/40 |
| WO | 0060689 A1 | | 10/2000 | |

OTHER PUBLICATIONS

Search Report for French Application No. 1454173, Institut National de la Propriete Industrielle, France, Oct. 17, 2014, 8 pages.

*Primary Examiner* — Patrick Ryan
*Assistant Examiner* — Aaron Greso
(74) *Attorney, Agent, or Firm* — Seed IP Law Group LLP

(57) ABSTRACT

Circuits and methods for putting into service a lithium ion battery including a first charging step under a current of at most a few tens of microamperes per square centimeter for a plurality of hours.

13 Claims, 3 Drawing Sheets

(51) Int. Cl.
*H01M 10/0562* (2010.01)
*H02J 7/00* (2006.01)

(56) References Cited

U.S. PATENT DOCUMENTS

2007/0202408 A1* 8/2007 Nakanishi ............. H01M 4/134
429/231.9
2008/0280206 A1* 11/2008 Oukassi ................. H01M 2/10
429/231.5

* cited by examiner

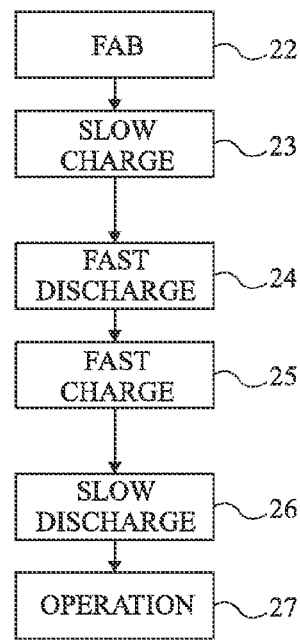
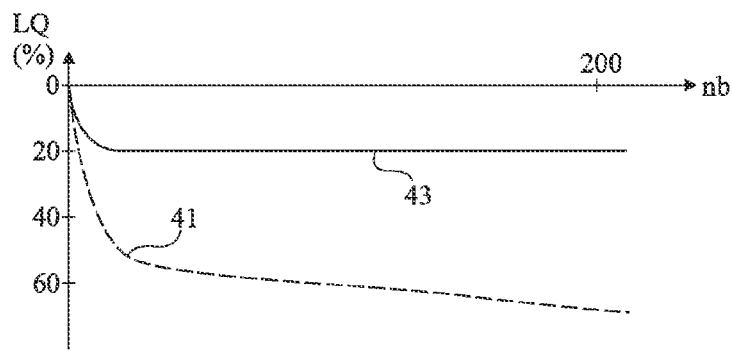
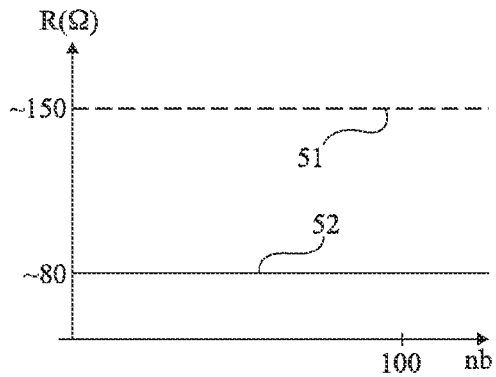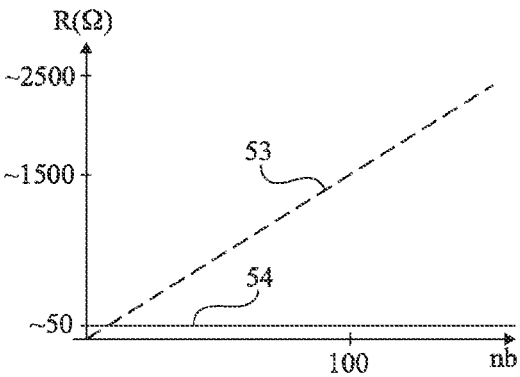

PUTTING INTO SERVICE OF A LITHIUM ION BATTERY

CROSS-REFERENCE TO RELATED APPLICATION

This application claims the priority benefit of French Patent application number 14/54173, filed on May 9, 2014, the contents of which is hereby incorporated by reference in its entirety to the maximum extent allowable by law.

BACKGROUND

Technical Field

The present disclosure generally relates to batteries intended to power electronic circuits and, more particularly, to thin-film lithium ion batteries.

Description of the Related Art

Lithium ion batteries have significantly developed over the last years. Such thin-film batteries, called all-solid (as opposed to liquid electrolyte batteries), may be manufactured by using microelectronics technologies.

Up to now, industrially-available batteries of this type require the deposition of a metal lithium layer, as a negative electrode, between a layer forming the electrolyte and a negative current collector, generally made of copper. The forming of such a metal lithium layer generates significant manufacturing constraints in terms of method, of pollution, and of security. In particular, metal lithium melts at less than 200 degrees, which raises issues for the subsequent manufacturing steps. Further, a lack of control of the thickness of the deposited layer entails risks of battery explosion.

Research has been conducted to avoid the deposition, on manufacturing, of a metal lithium layer. Such batteries, formed with no metal lithium layer deposition on the negative electrode side, are currently not industrially reliable, due to a significant drop in capacity and to a strong increase of the internal resistance of the battery during the successive charge and discharge cycles.

BRIEF SUMMARY

An embodiment aims at overcoming all or part of the disadvantages of usual lithium ion batteries.

Another embodiment aims at providing an all-solid lithium battery requiring no deposition of a metal lithium layer on manufacturing.

Another embodiment aims at providing a solution compatible with an industrial use of such batteries.

Thus, an embodiment provides a method of putting into service a lithium ion battery including a first charge step under a current of at most a few tens of microamperes per square centimeter for a plurality of hours.

According to an embodiment, a second charge step is carried out under a current at least 10 times greater than that of the first charge step.

According to an embodiment, the first charge step is followed by a first discharge step with a current at least 10 times greater than the current of the first charge step.

According to an embodiment, the second charge step is followed by a second discharge step under a current of the same order of magnitude as that used in the first charge step.

According to an embodiment, the current of the first charge step is lower than 33 µA per square centimeter of active surface area, preferably in the order of 10 microamperes per square centimeter of active surface area.

According to an embodiment, the current of the second charge step is of several hundred microamperes per square centimeter of active surface area.

According to an embodiment, the current of the first discharge step is in the order of several hundred microamperes per square centimeter of active surface area.

According to an embodiment, the current of the second discharge step is lower than 33 µA per square centimeter of active surface area, preferably in the order of 10 microamperes per square centimeter of active surface area.

An embodiment also provides a thin-film lithium ion battery, put into service by the above method, wherein, between a LiPON-type electrolyte layer and a copper electrode is placed a metal lithium layer topped with metal lithium pillars embedded in the copper layer.

According to an embodiment, the metal lithium layer has a thickness in the range from 100 to 200 nanometers.

According to an embodiment, the metal lithium pillars in the copper layer have a cross-section of a few micrometers.

The foregoing and other features and advantages will be discussed in detail in the following non-limiting description of specific embodiments in connection with the accompanying drawings.

BRIEF DESCRIPTION OF THE SEVERAL VIEWS OF THE DRAWINGS

FIG. 2 illustrates, in the form of blocks, an embodiment of a method of putting into service a lithium ion battery with no metal lithium deposit;

FIG. 4 is a graph illustrating the charge capacity loss of a lithium ion battery with and without implementation of the method of FIG. 2; and FIGS. 5A and 5B are graphs illustrating the variation of the internal resistance of a lithium ion battery, respectively in the charged state and in the discharged state, with and without implementation of the method of FIG. 2.

DETAILED DESCRIPTION

Figure 1A:
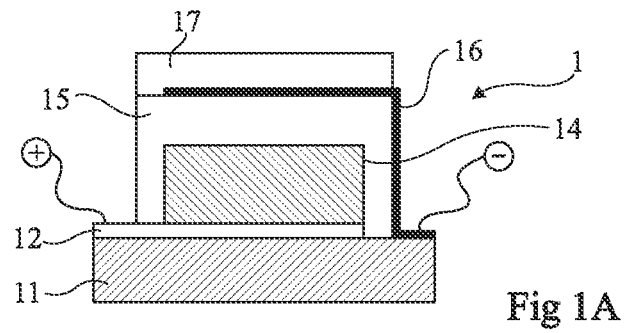
FIGS. 1A, 1B, and 1C are simplified cross-sectional views of a lithium ion battery with no metal lithium deposit.

The same elements have been designated with the same reference numerals in the different drawings. For clarity, only those steps and elements which are useful to the understanding of the described embodiments have been shown and will be detailed. In particular, the forming of the different thin films forming a battery has not been detailed, the embodiments described herein being compatible with usual manufacturing methods. Further, the applications using such a battery have not been detailed either, the described embodiments being here again compatible with usual applications of such batteries. Moreover, for a better understanding, the drawings are not to scale. Unless otherwise specified, expressions "approximately", "substantially", and "in the order of" mean to within 10%, preferably to within 5%.

Figure 1B:
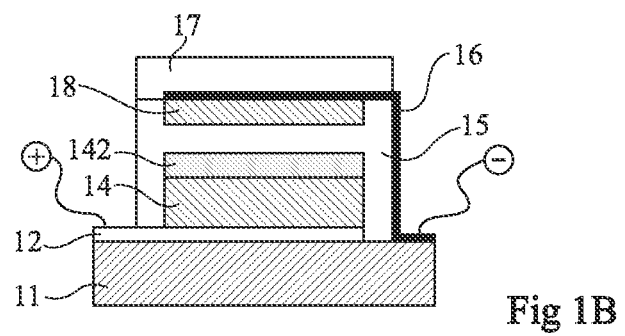
Figure 1C:
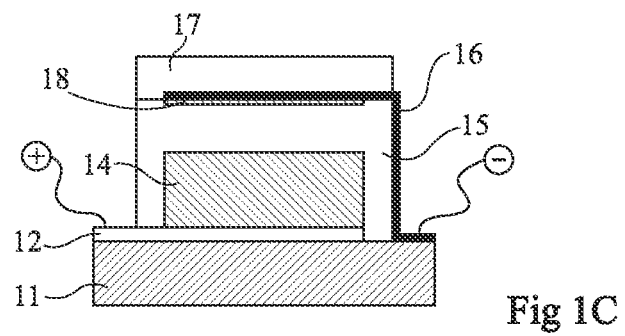

FIGS. 1A, 1B, and 1C are simplified cross-sectional views of a lithium ion battery 1 with metal lithium layer deposit on the negative electrode side. Such batteries are commonly called "Li-free" batteries.

These batteries are generally formed in thin films or layers by techniques originating from integrated circuit manufacturing, from a substrate 11 having different layers intended to form the battery deposited and formed thereon.

FIGS. 1A to 1C very schematically show a single battery, knowing that, in practice, a large number of batteries per full wafer are formed.

An all-solid thin-film lithium ion (Li-ion) battery is formed of a stack of a plurality of layers from substrate 11. A first layer 12 made of a conductive metallic material (for example, of an alloy of cobalt and gold or of platinum) is deposited on substrate 11. Layer 12 forms the current collector on the positive electrode side (+) of the battery. In the embodiments targeted by the present disclosure, a layer 14 of cobalt dioxide and of lithium ($LiCoO_2$) is deposited on layer 12 and forms the positive electrode. The assembly is surrounded with an electrolyte 15 of LiPON type (lithium phosphorus oxynitride). Electrolyte 15 is covered, at least on its upper surface, with a copper layer 16 forming the negative electrode or anode (−). In the example of FIGS. 1A to 1C, current collector 12 protrudes from the electrolyte at least partially on one side of the structure to form a contacting area. Similarly, to ease the contacting, copper layer 16 forms a step to end on substrate 11 and join contacting areas, not shown. The assembly is encapsulated in a protection layer 17. The representations of FIGS. 1A to 1C are very simplified and do not necessarily reflect reality, particularly in terms of layer thickness. Further, only the main layers useful to the understanding have been illustrated and other layers, for example, bonding or separation layers, may be present according to the manufacturing method used.

FIG. 1A shows the battery in its initial state, that is, after manufacturing before any charge and discharge phase.

FIG. 1B illustrates the battery in a charged state. Although the battery is manufactured (FIG. 1A) with no metal lithium layer, when the battery is charged, a lithium layer 18 is present at the interface between LiPON electrolyte 15 and copper electrode 16.

Layer 18 originates from the migration of lithium ions from layer 14 to electrolyte 15 and from electrolyte 15 to copper layer 16 where they deposit in metal form. This phenomenon has been illustrated by a sub-layer 142 in layer 14 symbolizing a sub-layer partly depleted of its lithium ions.

FIG. 1C illustrates the discharged battery. According to the discharged state, a metal lithium layer of variable thickness 18 remains at the interface between copper electrode 16 and electrolyte layer 15. During the discharge, the lithium ions which have formed metal layer 18 migrate in return towards electrolyte 15, and then towards layer 14, and sub-layer 142 disappears (or decreases).

Metal lithium layer 18 forms ("Li plating") on each charge cycles and is stripped ("Li stripping") on each discharge cycle.

The internal resistance of the battery in the discharged state significantly increases along the charge and discharge cycles, and the charge capacity of the battery significantly decreases. Such problems currently adversely affect the industrial use of Li-free batteries, which does not enable electronic systems to benefit from the advantages that Li-free batteries provide in terms of manufacturing.

The inventors have observed that by providing a specific process of putting into service a lithium ion battery, such disadvantages could be overcome.

FIG. 2 illustrates, in the form of blocks, an embodiment of a method of putting into service a lithium ion battery 2 manufactured with no metal lithium layer (i.e., a Li-free battery).

FIGS. 3A, 3B, 3C, and 3D are simplified cross-sectional views illustrating the battery behavior at different steps of the method of FIG. 2.

Figure 3A:
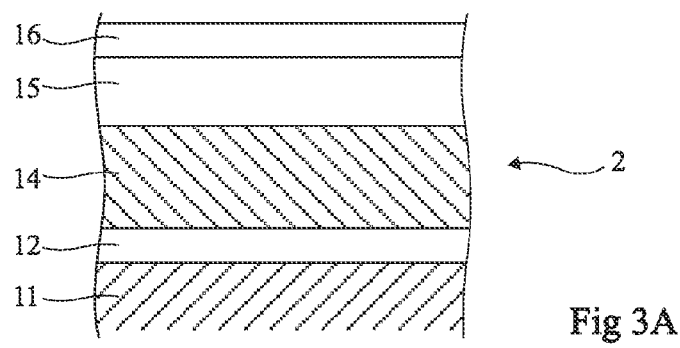
FIGS. 3A, 3B, 3C, and 3D are cross-sectional views illustrating the putting into service of a lithium ion battery performed in accordance with FIG. 2.

FIG. 3A very schematically shows a stack of layers of a battery at the end of the manufacturing and before the putting into service. This drawing corresponds to the representation of FIG. 1A. The thicknesses have however not been respected and only the central portion has been illustrated. It shows a substrate 11 topped with a positive metal current collector 12. Collector 12 has a positive $LiCoO_2$ electrode 14 and a LiPON-type electrolyte 15 arranged thereabove. Layer 15 is topped with a copper layer 16 forming the negative electrode. For simplification, the covering or encapsulation layer (17, FIGS. 1A to 1C) has not been shown.

As a specific embodiment, the layers of the structure of FIG. 3A have the following thicknesses:
collector 12: in the order of 100 nm;
$LiCoO_2$ electrode 14: in the order of 5 μm;
LiPON electrolyte 15: in the order of 2 μm;
electrode 16: in the order of 500 nm.

The initial state of the battery is that of a usual thin-film lithium ion battery manufactured with no metal lithium layer (Li-Free). In other words, the embodiments which will be described require no modification of the battery manufacturing and are thus compatible with currently manufactured "Li-Free" batteries (FIG. 2, block 22, FAB).

The battery after manufacturing is submitted to a first step of putting into service.

This first step (block 23, SLOW CHARGE) comprises submitting the battery to a slow charge under a constant current. A slow charge under a constant current means a charge where the current per unit of active battery surface area, which flows from current collector 12 to electrode 16, is at most a few tens of microamperes per square centimeter, preferably lower than approximately 33 $\mu A/cm^2$ (for example, between 3 $\mu A/cm^2$ and 26 $\mu A/cm^2$, preferably in the order of 10 $\mu A/cm^2$). This is a low current (with a ratio of at least 10) as compared with currents to which batteries of this type are usually submitted in an initial charge. Indeed, such batteries are usually charged by being applied a constant voltage in the order of 4.2 volts, and the current then generally reaches values in the order of a few milliamperes.

Slow charge step 23 lasts for a longer time (several hundreds of hours) than a conventional initial charge phase (less than one hour) and than charge phases to which the battery will subsequently be submitted in operation.

Initial charge 23 carries on until the voltage across the battery reaches an operating or nominal value, typically in the range from 4 to 4.2 volts for a battery of this type.

Figure 3B:
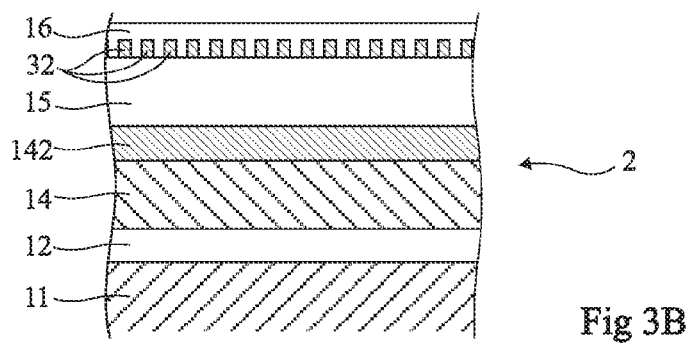
Figure 3C:
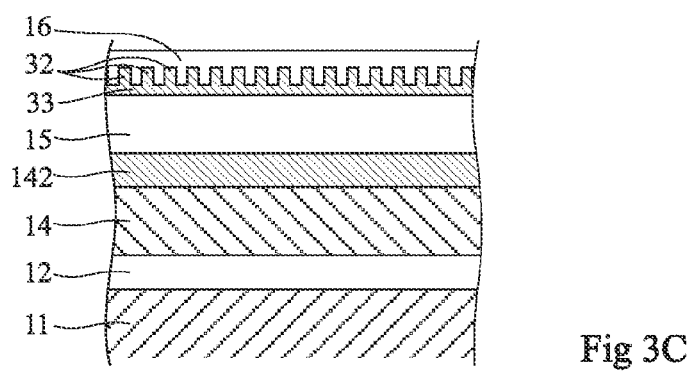

FIG. 3B illustrates the battery state at the end of slow charge block or step 23. Surprisingly, metal lithium pillars 32 form in copper layer 16. On the side of $LiCoO_2$ layer 14, the forming of a sub-layer 142 partially depleted of its lithium ions, which have migrated towards electrolyte 15, can be observed.

An attempt of interpretation of this phenomenon is that copper layer 16 has, at the interface between layers 15 and 16, asperities or surface defects into which metal lithium introduces during the migration of lithium ions from electrolyte layer 15. Such a phenomenon does not occur in case of a charge under a strong current, as if the surfaces were then smoothed by melting.

In a second step (block 24, FAST DISCHARGE, FIG. 2), the battery is made to rapidly discharge, and then to rapidly charge (block 25, FAST CHARGE).

"Fast charge and discharge" means cycles during which the current flowing through the battery (from electrode 16 to electrode 14 for the charge and from electrode 14 to electrode 16 for the discharge) is by a ratio of at least 10 with respect to that of slow charge 23. For example, the fast charge and discharge current is of several hundreds of microamperes per square centimeter. As an example, the duration of steps 24 and 25 is less than one hour, for example, a few tens of minutes.

Discharge cycle 24 is used to recover a charge capacity within the battery for fast charge step 25. Discharge 24 is fast to avoid causing the elimination or disappearing of pillars 32 formed at the previous step.

Fast charge step 25 causes the forming, under lithium pillars 32, of a homogeneous metal lithium layer 33. Metal lithium layer 33 actually corresponds to the layer usually formed in a usual battery (layer 18, FIG. 1B).

Preferably, step 25 is followed by a slow discharge step 26 (SLOW DISCHARGE), that is, with a current of the same order of magnitude as during step 23 (at most a few tens of microamperes per square centimeter, preferably lower than approximately 33 $\mu A/cm^2$, for example, between 3 $\mu A/cm^2$ and 26 $\mu A/cm^2$, preferably in the order of 10 $\mu A/cm^2$). The function of the slow discharge step is to stabilize the putting into service of the battery and, among others, to decrease the internal resistance thereof by restoring layer 14. The duration of slow discharge step 26 is of the same order of magnitude as that of slow charge step 23, for example, a few tens of hours.

Figure 3D:
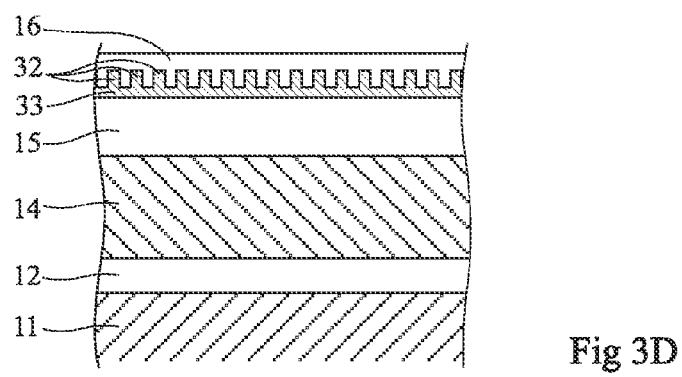

The final state, after step 26, is illustrated in FIG. 3D. As compared with a usual putting into service (FIG. 1C), pillars 32 are present and a homogeneous thickness of layer 33 is preserved. The height of pillars 32 may decrease during slow discharge step 26. However, due to the previous fast discharge step 24 and fast charge step 25, homogeneous layer 33 avoids the elimination or disappearing of the pillars.

At the end of the steps of putting into service, the battery can be submitted to usual charge and discharge cycles in operation (block 27, OPERATION). In practice, charge cycles are generally fast and discharge cycles depend on the power consumption of the electronic circuits powered by the battery.

The inventors have observed that with such a process of putting the battery into service, the metal lithium layer did not disappear on discharge of the battery, conversely to what occurs in a usual battery (FIG. 1C). Homogeneous metal lithium layer 33 seems to be "fastened" to the copper layer by pillars 32.

The presence of pillars 32, preferably combined with the preservation of metal lithium layer 33, improves the electrochemical behavior of the battery, particularly its resistive behavior and its charge capacity.

The dimension of pillars 32 depends on the intensity under which initial charge 23 is carried out. The lower the current, the greater the diameter or the section of the pillars, but the smaller the number thereof. The larger the diameter of pillars 32, the better. However, the lower the current, the longer the initial charge step. A compromise has to be found in terms of charge time.

As an example, pillars 32 formed under an intensity in the range from some ten microamperes to some hundred microamperes have dimensions of a few micrometers.

Still as an example, metal lithium layer 33 resulting from step 25 has a thickness in the range from 100 to 200 nanometers.

FIG. 4 schematically illustrates charge capacity loss LQ in % (in practice, measured in discharge mode) of the battery relative to an initial capacity, according to the number of charge and discharge cycles to which the battery is submitted. In FIG. 4, curve 41 in dotted lines illustrates the behavior of a battery submitted to a usual putting into service while curve 43 in full line illustrates the charge capacity loss obtained with a same battery submitted to the method of FIG. 2. As appears from this drawing, the implementation of the above-described method of putting into service considerably improves the battery behavior and stabilizes it.

FIGS. 5A and 5B illustrates the resistive behavior of a battery submitted to the method of FIG. 2 (curves 52 and 54) with respect to an identical battery submitted to a usual putting into service (curve in dotted lines 51 and 53). FIG. 5A shows the resistance of the battery in the charged state while FIG. 5B shows its resistance in the discharged state.

FIG. 5A shows that in the charged state, the resistance of the "pillar" battery is lower (in this example, in the order of 80 ohms as compared with approximately 150 ohms). The battery efficiency is thus improved.

Above all, FIG. 5B shows the possibility of sustainably using such batteries. Indeed, from a number of cycles in the order of a few hundreds, while the internal resistance in the discharged state of a battery put into service in usual fashion exceeds one kilo-ohms, which makes its cost-effective charge almost impossible, the resistance of the battery put into service by the above-described method remains a few tens of ohms.

The method is implemented on a finished battery, that is, once it has been encapsulated. Preferably, the steps of putting into service are carried out before the battery connection in its application environment, which avoids providing a specific charge and discharge circuit in the electronic circuit using the battery power.

It should be noted that the progress of metal lithium pillars 32 in copper layer 16 is not of concern, including if they cross the copper layer. Indeed, if an apparent metal lithium layer raises an issue on manufacturing thereof, this issue is not raised herein, since this occurrence, should it happen, intervenes once the battery is finished and packaged.

Various embodiments have been described. Various alterations, modifications, and improvements will readily occur to those skilled in the art. In particular, the compromise between the duration of slow charge phase 23 and the current to which it is submitted may vary within the range given in the present disclosure, in particular according to the desired time of putting into service. Further, although the complete succession of steps 23 to 26 described in relation with FIG. 2 is a preferred embodiment, an improvement over a usual putting into service can already be observed without step 26, or even without steps 24 and 25.

Further, the practical implementation of the described embodiments is within the abilities of those skilled in the art based on the functional indications given hereabove in particular as concerns the forming of a circuit of putting into service adapted to the described method.

Such alterations, modifications, and improvements are intended to be part of this disclosure, and are intended to be within the spirit and the scope of the present disclosure. Accordingly, the foregoing description is by way of example only and is not intended to be limiting. The present disclosure is limited only as defined in the following claims and the equivalents thereto.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method, comprising:
forming a lithium ion battery; and
charging the lithium ion battery with a first current of at most a few tens of microamperes per square centimeter for a plurality of hours;
discharging the lithium ion battery with a second current at least ten times greater than the first current;
charging the lithium ion battery with a third current at least ten times greater than the first current; and
discharging the lithium ion battery with a fourth current of the same order of magnitude as the first current.

2. The method of claim 1, wherein discharging the lithium ion battery with the second current and charging the lithium ion battery with the third current each have a duration that is less than one hour.

3. The method of claim 1, wherein charging the lithium ion battery with the first current of at most a few tens of microamperes per square centimeter for the plurality of hours comprises charging the lithium battery with the first current for a few tens of hours.

4. The method of claim 1, wherein the current of the first charge step is lower than 33 µA per square centimeter of active surface area, preferably in the order of 10 microamperes per square centimeter of active surface area.

5. The method of claim 2, wherein the current of the second charge step is of several hundred microamperes per square centimeter of active surface area.

6. The method of claim 3, wherein the current of the first discharge step is of several hundred microamperes per square centimeter of active surface area.

7. The method of claim 6, wherein the current of the second discharge step is lower than 33 µA per square centimeter of active surface area, preferably in the order of 10 microamperes per square centimeter of active surface area.

8. A method of charging a lithium ion battery, the method comprising:
charging for a plurality of hours the lithium ion battery with a first charging current that is less than or equal to a few tens of microamperes per square centimeter;
discharging the lithium ion battery with a first discharge current that is at least ten times greater than the first charging current immediately after charging the lithium ion battery with the first, charging current;
charging the lithium ion battery with a second charging current that is at least ten time greater than the first charging current immediately after discharging the lithium ion battery with the first discharge current; and
discharging the lithium ion battery with a second discharge current having a magnitude that is approximately equal to the first charging current immediately after charging the lithium ion battery with the second charging current.

9. The method of claim 8, wherein discharging the lithium ion battery with the first discharge current comprises discharging the lithium ion battery with a first discharge for a few tens of minutes.

10. The method of claim 9, wherein charging for the plurality of hours the lithium ion battery with the first charging current and discharging the lithium ion battery with the second discharge current comprise charging and discharging the lithium ion battery for a few tens of hours.

11. The method of claim 8, wherein the first charging current is less than approximately 33 µA per square centimeter of active surface area of the lithium ion battery and the second charging current has a magnitude of approximately several hundred microamperes per square centimeter of active surface area of the lithium battery.

12. The method of claim 10, wherein the first discharge current has a magnitude of approximately several hundred microamperes per square centimeter of active surface area of the lithium ion battery.

13. The method of claim 8, wherein the second discharge current has a magnitude that is less than approximately 33 µA per square centimeter of active surface area of the lithium ion battery.

* * * * *